United States Patent [19]
Ahn et al.

[11] Patent Number: 5,704,343
[45] Date of Patent: Jan. 6, 1998

[54] FURNACE CONDENSATE TRAP

[75] Inventors: Hongsik Ahn, Langhorne; Alex M. Hofman, Newtown, both of Pa.

[73] Assignee: American Standard Inc., Piscataway, N.J.

[21] Appl. No.: 712,400

[22] Filed: Sep. 11, 1996

[51] Int. Cl.$^6$ ................................................. F24H 3/02
[52] U.S. Cl. ........................... 126/110 R; 126/116 R; 137/314
[58] Field of Search .................. 126/110 R, 116 R; 137/314

[56] References Cited

U.S. PATENT DOCUMENTS

| | | | |
|---|---|---|---|
| 4,479,482 | 10/1984 | Cherington | 126/99 |
| 4,481,935 | 11/1984 | Bawel | 126/307 |
| 4,543,892 | 10/1985 | Tomlinson et al. | 110/203 |
| 4,603,680 | 8/1986 | Dempsey et al. | 126/99 |
| 4,611,622 | 9/1986 | Ahn | 137/145 |
| 4,627,460 | 12/1986 | Eising | 137/192 |
| 4,653,466 | 3/1987 | DeHaan et al. | 126/110 |
| 4,682,579 | 7/1987 | Bigham | 126/110 |
| 4,729,328 | 3/1988 | Shellenberger | 110/193 |
| 4,856,550 | 8/1989 | Smelcer | 137/192 |
| 4,892,045 | 1/1990 | Schumacher | 110/203 |
| 4,899,726 | 2/1990 | Waterman | 126/110 |
| 5,060,722 | 10/1991 | Zdenek et al. | 165/170 |
| 5,115,798 | 5/1992 | Moore, Jr. et al. | 126/351 |
| 5,309,890 | 5/1994 | Rieke et al. | 126/110 |
| 5,309,892 | 5/1994 | Lawlor | 126/110 |
| 5,347,980 | 9/1994 | Shellenberger | 126/110 |
| 5,375,586 | 12/1994 | Schumacher et al. | 126/110 |
| 5,379,749 | 1/1995 | Rieke et al. | 126/110 |
| 5,469,879 | 11/1995 | Rasmussen | 137/187 |
| 5,476,088 | 12/1995 | Hamos | 126/110 |

*Primary Examiner*—Carroll B. Dority
*Attorney, Agent, or Firm*—William J. Beres; William O'Driscoll; Peter D. Ferguson

[57] ABSTRACT

A condensate trap assembly. The assembly comprises a housing having first and second condensate inlets where the first condensate inlet is sized to pass more condensate than the second condensate inlet. The housing has an ambient air inlet providing access to an ambient air chamber within the housing, a first condensate chamber open to the first condensate inlet, and a second condensate chamber open to the second condensate inlet. The first condensate chamber, the second condensate chamber, and the ambient air chamber are open to each other and the first condensate chamber includes airflow restrictors to retard the volume of airflow through the first chamber.

36 Claims, 5 Drawing Sheets

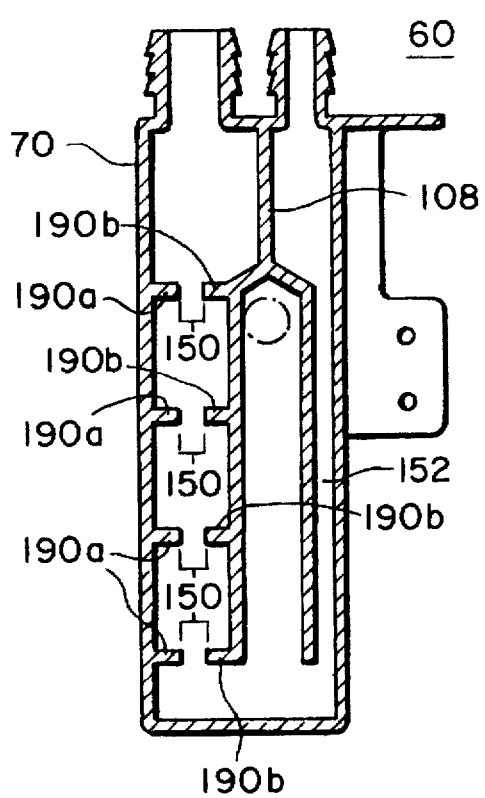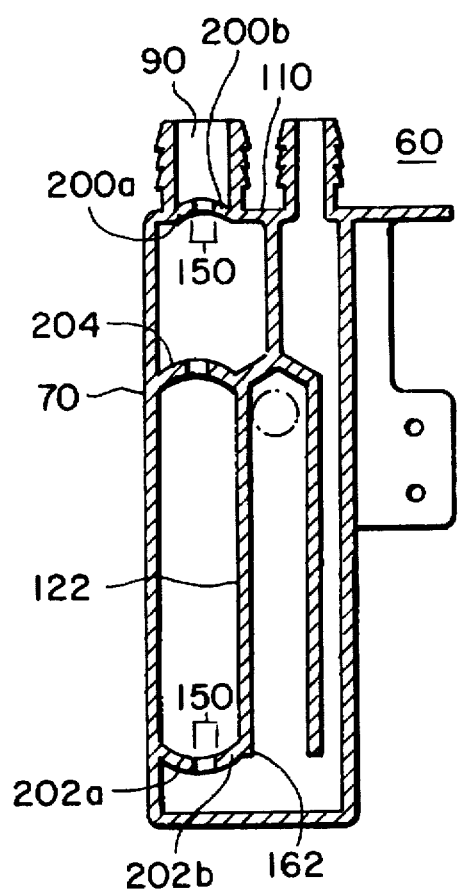
FIG. 6
FIG. 7

FURNACE CONDENSATE TRAP

BACKGROUND OF THE INVENTION

The present invention is directed to a condensate trap assembly for a residential furnace.

Condensate drain trap assemblies allow ambient air to enter the furnace at the initial startup of the furnace, and then block airflow as condensate fills the trap. Condensate is drained both from the cold box receiving the flue gases and from the inducer fan impelling the flue gases from the cold box into the flue vent. The condensate is generally drained by a line from the cold header box to the condensate trap assembly and by a line from the inducer fan housing to the condensate trap assembly. It is usually required that the line from the cold box to the condensate trap assembly be larger than the line from the inducer housing since more condensate tends to accumulate in the cold header box. However, it is also desirable that each of these lines be as small as feasible to control the amount of ambient air that enters the furnace at startup. A drain line from the drain trap assembly provides an egress for the condensate and an ingress for the ambient air at start up.

Various traps are known including that shown in U.S. Pat. No. 5,379,749 to Rieke et al. This patent has separate reservoirs and separate traps for handling high and low pressure gaseous environments.

SUMMARY OF THE INVENTION

It is an object, feature and advantage of the present invention to solve the problems of the prior art condensate trap assemblies.

It is an object, feature and advantage of the present invention to provide a condensate trap assembly which retards the passage of ambient air to the cold header box without substantially retarding the passage of condensate from the cold header box into the condensate trap, thus enabling fast buildup of the condensate in the trap.

It is a further object, feature and advantage of the present invention to provide a condensate trap assembly which retards the ingress of ambient air to the cold header box assembly slightly prior to terminating the ingress of ambient air to the inducer fan assembly.

In addition, it is a further object, feature and advantage of the present invention to provide a condensate trap assembly which retards the ingress ambient air during the initial start up without the presence of condensate.

The present invention provides a condensate trap assembly comprising a housing having first and second condensate inlets where the first condensate inlet is sized to pass more condensate than the second condensate inlet. The housing has an ambient air inlet providing access to an ambient air chamber within the housing, a first condensate chamber open to the first condensate inlet, and a second condensate chamber open to the second condensate inlet. The first condensate chamber, the second condensate chamber, and the ambient air chamber are open to each other and the first condensate chamber includes airflow restrictors to retard the volume of airflow through the first chamber.

The present invention further provides a condensate drain trap comprising a housing having first, second and third chambers. The housing includes a first aperture having a first size and providing ingress for a first fluid into the first chamber and providing egress for a second fluid from the first chamber. The housing includes a second aperture having a second size less than the first size and providing ingress for the first fluid into the second chamber and providing egress for the second fluid from the second chamber. The housing includes a third aperture providing ingress for the second fluid into the third chamber and providing egress for the first fluid from the third chamber. The first chamber includes restrictors to retard passage of the second fluid without substantially retarding the passage of the first fluid.

The present invention additionally provides a condensate drain trap assembly comprising a housing having an interior divided into a first inlet chamber, a second inlet chamber, and an outlet chamber. The housing includes a first aperture forming a first inlet to the first inlet chamber; a second aperture forming a second inlet to the second inlet chamber and a third aperture forming an outlet from the outlet chamber. The size of the first inlet is greater than the size of the second inlet, and the first inlet chamber includes a plurality of restrictors adapted to enhance liquid flow while restricting airflow.

The present invention also provides a method of controlling condensate and airflow in a furnace. The method comprises the steps of: allowing impeded airflow through a condensate trap to a cold header box and to an inducer fan at startup; providing unrestricted condensate drainage to the condensate trap from the inducer fan; providing restricted condensate drainage to the condensate trap from the cold header box; accumulating condensate in the condensate trap; and blocking the flow of air through the condensate trap when the accumulated condensate reaches a first predetermined height.

The present invention further provides a gas furnace. The furnace comprises: a condensate trap assembly having first, second and third apertures; a cold header box having an aperture adapted to drain condensate; an inducer fan having an aperture adapted to drain condensate; and a housing including the condensate trap assembly, the cold header box and the inducer fan. The housing includes an outlet; a first condensate and ambient air line operatively connected between the cold box aperture and the first trap assembly aperture; a second condensate and ambient air line operatively connected between the inducer fan aperture and the second trap assembly aperture; and a third condensate and ambient air line between the housing outlet and the third aperture. The condensate trap assembly also includes air pressure enhancement devices between the first aperture and the third aperture.

BRIEF DESCRIPTION OF THE DRAWINGS

FIG. 6 is a first alternative embodiment of the condensate trap assembly also taken along 5—5 of FIG. 4.

FIG. 7 is a second alternative embodiment of the condensate trap assembly also taken along 5—5 of FIG. 4.

DETAILED DESCRIPTION OF THE INVENTION

The present invention is directed to condensate trap assemblies for residential furnaces. Exemplary furnaces are shown in U.S. Pat. No. 5,060,722 to Zdenek et al. and U.S. Pat. No. 5,309,892 to Lawlor, both of which are assigned to the assignee of the present invention and incorporated by reference herein.

Figure 1:
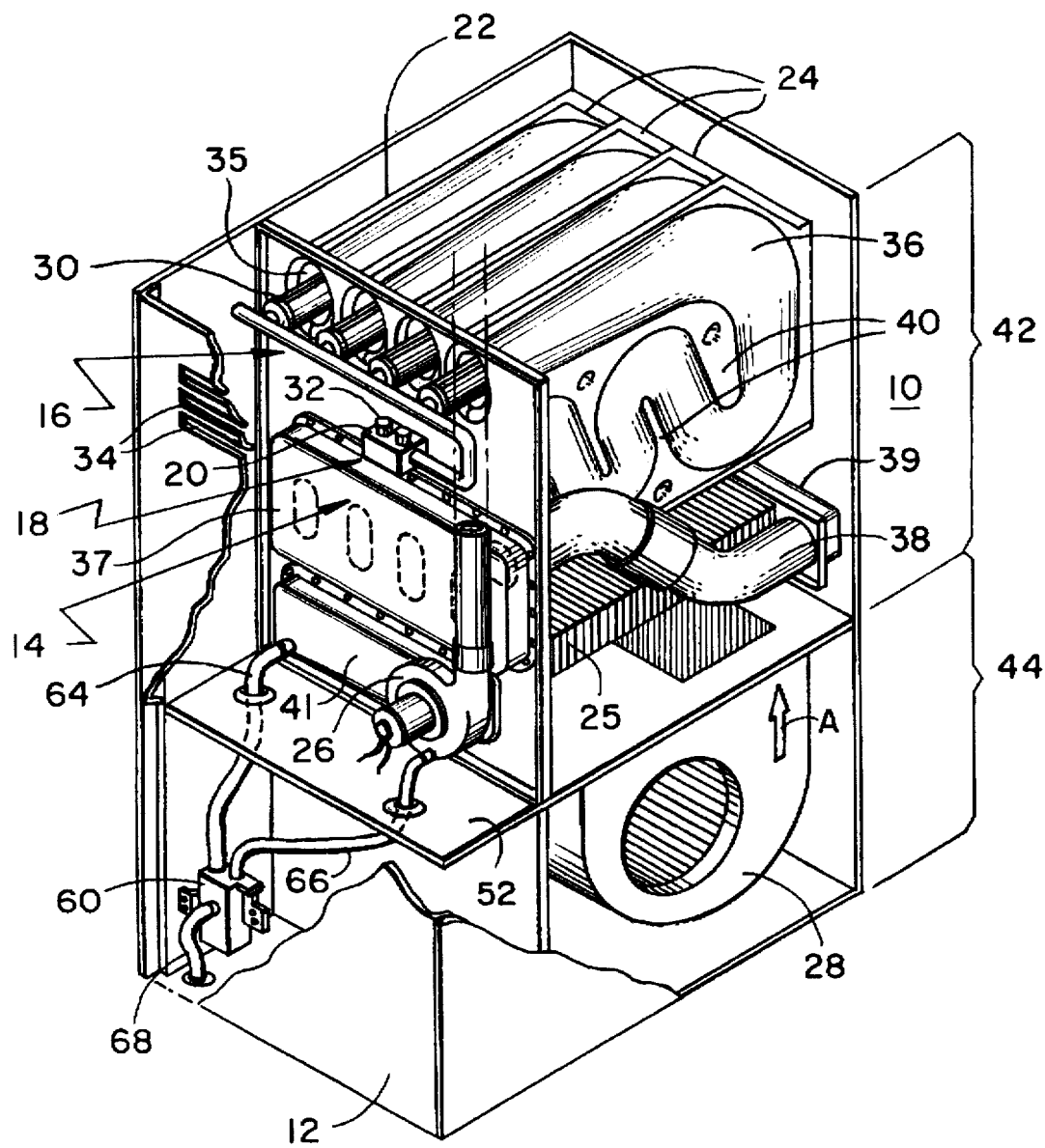
FIG. 1 is a cutaway view of an upflow gas furnace including the condensate trap assembly of the present invention.

FIG. 1 shows an upflow gas furnace 10 including a cabinet 12; a combustion system 14 including a burner assembly 16, a gas valve assembly 18 and a control assembly 20; a heat exchanger assembly 22 including a plurality of heat exchangers 24 serially connected to a condensing heat exchanger 25; an induced draft blower 26; and a circulating air blower 28. The circulating air blower 28 blows air in the direction indicated by arrow A.

The burner assembly 16 of the gas furnace 10 includes a plurality of inshot burners 30 manifolded to a supply of fuel gas. The gas valve assembly 18 includes a gas valve 32 which controls the gas supply so that an appropriate air fuel mixture is provided to the burners 30. The air for the air fuel mixture enters through an air inlet 34 including louvers. Each burner assembly 16 includes a hot surface ignitor 35 to ignite the air fuel mixture. Each burner 30 directs the resultant combustion into one of the plurality of heat exchangers 24. Each burner 30 is in one-to-one correspondence to a particular heat exchanger 24. The heat exchanger 24 includes a serpentine passage 36 which provides maximum heat exchange with forced air from the circulating air blower 28 passing between the plurality of heat exchangers 24 and in the interstices 40 formed by the serpentine passage 36. The gases from the plurality of heat exchangers 24 are collected in a collection box 37, and directed by a passage 38 to a hot header box 39 of the condensing heat exchanger 25. The induced draft blower 26 pulls the flue gases resulting from combustion through the condensing heat exchanger 25 into a cold header box 41 and vents them to a chimney, a vent or the like (not shown).

Figure 2:
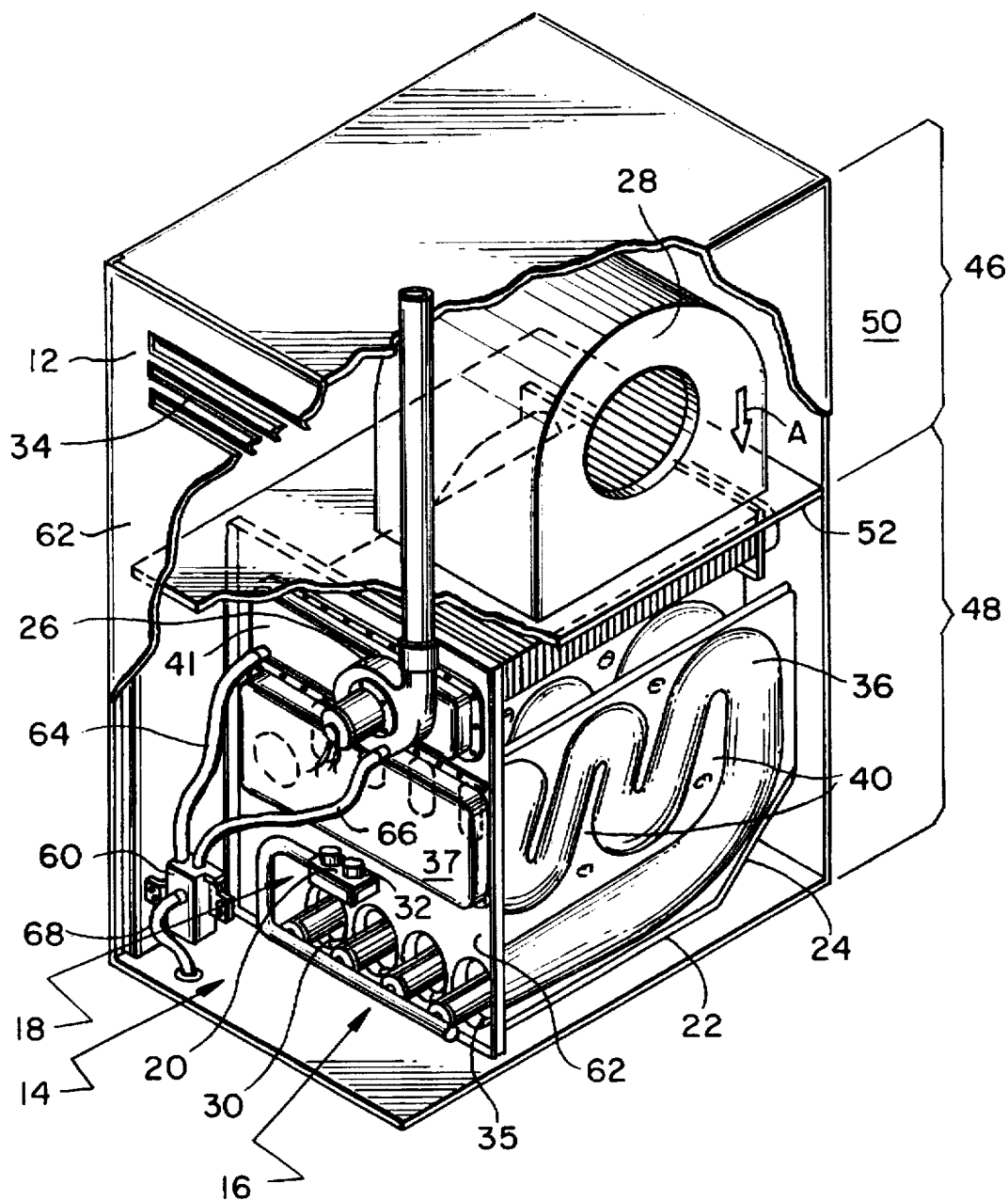
FIG. 2 is a cutaway view of a downflow gas furnace including the condensate trap assembly of the present invention.

The upflow furnace of FIG. 1 includes a heat exchanger section 42 which includes the heat exchangers 24 and 25, and a blower section 44 which includes the blower 28. In an upflow furnace the blower section 44 is below the heat exchanger section 42 and blows air to be heated in an upwardly direction, hence the term "upflow" furnace. FIG. 2 shows a downflow gas furnace 50 which is essentially similar to the upflow gas furnace 10 with the exception that the blower section 46 is mounted above the heat exchanger section 48 so as to blow air downwardly across the heat exchanger section 48, hence the term "downflow" furnace. The arrangement of the elements in the upflow and downflow furnaces is otherwise very similar and like reference numerals are used for the same elements in FIGS. 1 and 2.

Each of the furnaces 10, 50 includes a blower deck 52 which separates the heat exchanger section 42, 48 from the blower section 44, 46.

The present invention is directed to a condensate trap assembly including a condensate drain trap 60, the cold header box 41, a cold box drain line 64 from the cold header box 41 to the trap 60, an inducer drain line 66 from the inducer fan 26 to the trap 60, and a condensate drain line 68 from the trap 60 to a drain area. The condensate drain trap 60 is conventionally attached to the interior of the cabinet 12 or to the furnace housing 62. The trap 60 is connected to the cold header box 41 by the cold box line 64 and is connected to the induced draft blower 26 by the inducer drain line 66. The condensate drain line 68 is connected to the trap 60 and allows condensate to drain from the trap to an appropriate drain area, and also allows ambient air to enter the trap. In the preferred embodiment, each of the lines 64, 66, 68 is a flexible hose of a material suitable for use in a furnace application.

Figure 3:
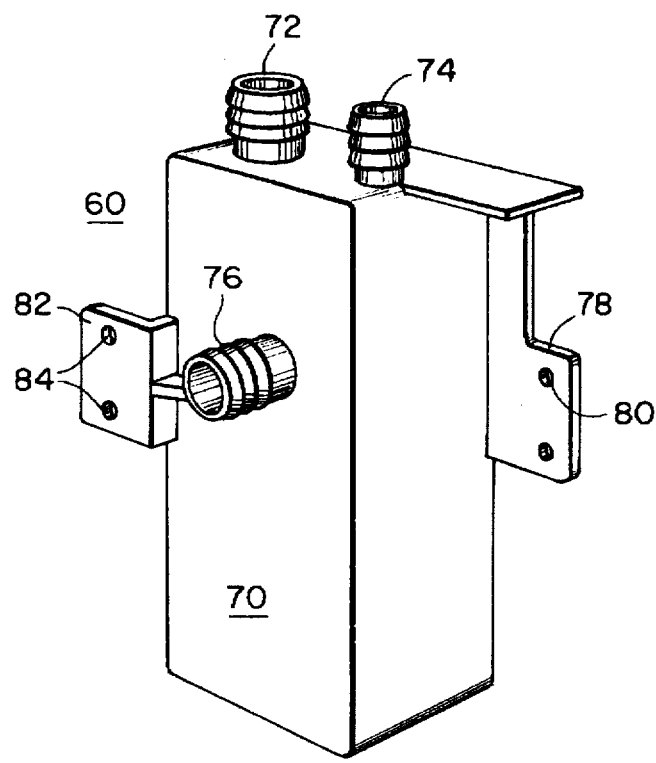
FIG. 3 shows a side perspective view of the condensate trap assembly of the present invention.
Figure 4:
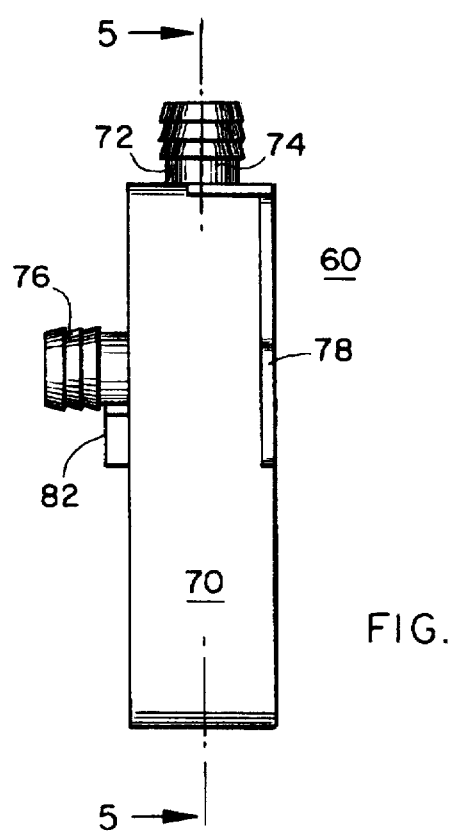
FIG. 4 shows a side view of the condensate trap assembly of FIG. 3.

FIGS. 3 and 4 show the condensate trap 60 in its upright installed position. The condensate trap 60 includes a housing 70, a cold box inlet 72, an inducer inlet 74, a condensate outlet 76, a back flange 78 including screw apertures 80 for attachment to the furnace wall 62, and a front flange 82 also including screw apertures 84 for mounting the trap assembly to the furnace wall 62. The condensate trap 60 is preferably formed of molded 'plastic' in a conventional manner.

Figure 5:
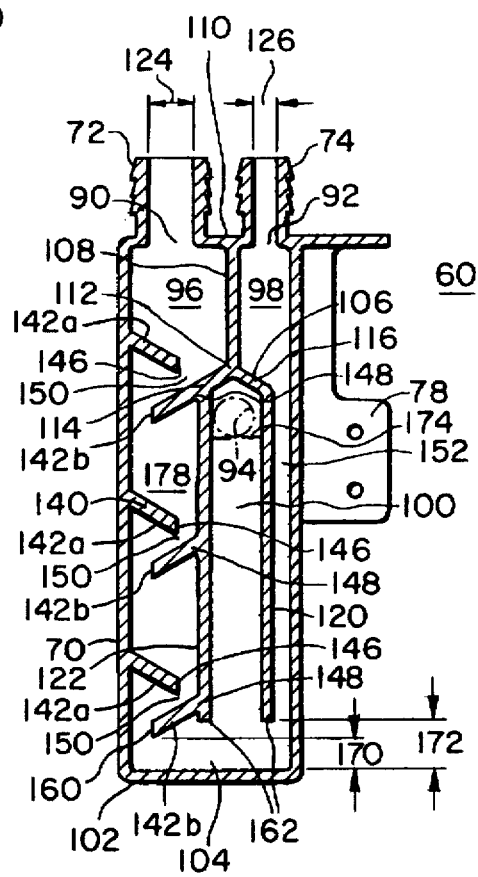
FIG. 5 shows a cutaway along 5—5 of FIG. 4 of the preferred embodiment of the condensate trap assembly.

A cutaway of the preferred embodiment of the condensate trap 60 is shown in FIG. 5. The housing 70 of the condensate trap 60 includes a cold header box aperture 90, an inducer aperture 92 and a condensate drain aperture 94. The condensate drain aperture 94 provides a port for the condensate outlet 76, the cold box aperture 90 provides a port for the cold box inlet 72, and the inducer aperture provides a port for the inducer inlet 74.

The interior of the housing 70 is divided into three chambers: a cold header box chamber 96, an inducer chamber 98 and a condensate outlet chamber 100. The chambers meet at a bottom 102 of the housing 70, and the area 104 where the chambers 96, 98 and 100 meet provides a reservoir for the condensate. A partition 106 having a tuning fork shape separates the chambers 96, 98, 100 from each other. The partition 106 includes a handle portion 108 attached to the housing 70 at an upper area 110 between the inlets 72, 74 and extending in a downward direction between the cold header box chamber 96 and the inducer chamber 98. At the distal end 112 of the handle 108, the handle 108 splits into a Y-shape having a pair of sloped arms 114, 116 being respectively associated with the cold box chamber 96 and the inducer chamber 98. The arms 114, 116 extend far enough to exceed the diameter of the condensate outlet aperture 94. The arm 116 terminates in an elongated tine 120 extending in a downward direction, while the arm 114 has an elongated tine 122 extending downwardly in mirror image fashion to the arm 116 and the tine 120. Each of the tines 120, 122 terminate above the bottom 102 so as to allow passage of air and condensate between the chambers 96, 98, 100.

The aperture 90 has a size 124 which can be measured by diameter, radius, area or the like where that size is greater than the corresponding size 126 of the aperture 92. This is because more condensate is expected to drain from the cold header box 41 than from the inducer blower 26. However, this facilitating of the downward drain of condensate means that the upward flow of ambient air through the cold header box chamber 96 is greater than desirable. Consequently, the cold header box chamber 96 includes air pressure enhancing devices such as restrictors 140, 200, 202, 204. These restrictors 140 greatly restrict airflow through the chamber 96 so that the volume of airflow through the chamber 96 is retarded without significantly affecting the drainage of condensate.

In the preferred embodiment shown in FIG. 5 these restrictors 140 comprise paired, sloped extensions 142a and 142b where the 'a' designation indicates an extension from the housing wall 70 and the 'b' designation indicates an extension from the partition 108. These extensions 142 are preferably sloped downwardly to facilitate condensate drainage. Additionally, each pair is slightly staggered so that a distal end of the extensions 142a approaches the base 148 of the extensions 142b. The distance between the adjacent base 148 and the distal ends 146 form gaps 150. The size of these gaps 150 is optimized to allow passage of condensate drops while providing a restriction to ambient air flowing in through the aperture 94 and up into the chamber 96.

The uppermost extension 142b may form a continuation of the arm 114. The lowermost extension 142b has a distal end 160 which extends lower than the ends 162 of the tines 120, 122. In practice this means that, as condensate fills the reservoir 104, the path to the cold header box chamber 96 is blocked by condensate sooner than the path to the inducer chamber 98 is blocked by condensate. This has the advantage of retarding the flow of ambient air into the furnace without terminating that airflow.

The condensate trap 60 operates as follows. At startup of the furnace, perhaps after being off all summer, ambient air enters the empty trap 60 through the aperture 94, proceeds down through the chamber 100 and up through the chambers 96 and 98 and respectively through the apertures 124 and 126. The ambient air then passes through tubes 66 and 64 into the inducer 26 and the cold header box 41 respectively. As the furnace warms up and commences normal operation, condensate begins to accumulate in the cold header box 41 and drains through the line 64 into the trap 60 through aperture 90. Similarly, condensate accumulates in the inducer blower 26, drains through the line 66 and into the trap assembly 60 through the aperture 92. The condensate drains down through the chambers 96 and 98 and accumulates in the reservoir 104. When the condensate reaches a first height 170, the accumulated condensate in the reservoir 104 blocks the flow of ambient air into the chamber 96. When the accumulated condensate reaches a second height 172, the accumulated condensate blocks the flow of ambient air into the chamber 98. Once this height is reached, ambient air no longer enters the furnace.

The condensate continues to accumulate and proceeds to fill the chamber 100, and, to a lesser extent, the chambers 96 and 98 due to the differing pressures from the furnace assembly and the inducer fan 26. Once the condensate reaches a level 174 in the chamber 100, the condensate begins to drain out the aperture 94 into the line 68.

To limit the effect of biological growth, restrictors 140 are not placed in an area 178 of chamber 96 that is approximately of the same height as the aperture 94. The sloping of the extensions 142 also helps avoid biological growth by avoiding places for condensate to accumulate.

FIG. 6 shows a first alternative embodiment of the present invention generally similar to the preferred embodiment shown in FIG. 5 but where the restrictors 140 comprise paired horizontal extensions 190. In this first alternative embodiment, the extensions 190 a and b, are not staggered but are each at the same height and are horizontally extending from the housing 70 or the partition 108 respectively. As before, the extensions 190 form a gap 150 similar in size to the narrow portion 152.

FIG. 7 shows a second alternative embodiment including an upper restrictor 200 and a lower restrictor 202. The upper restrictor 200 is located in the aperture 90 and includes an extension 200a extending from the housing 70 and an extension 200b extending from the portion 110. The lower restrictor 202 includes an extension 202b extending from the bottom end 162 of the tine 122 and an extension 202a extending from a similar position on the housing wall 70.

Again, the restriction 200 and 202 form gaps 150 sized to restrict the amount of ambient air entering and passing through the condensate trap 60. An alternative location of the upper restrictor 200 is shown in dashed outline as restrictor 204. Restrictors 204 and 202 are preferably convex relative to each other.

Figure 8A:
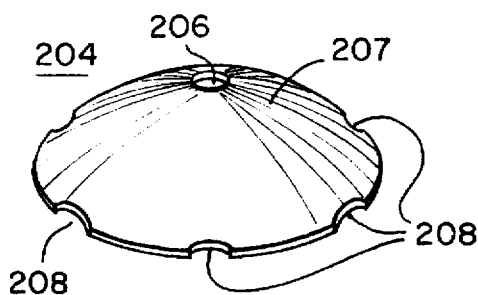
FIGS. 8A and 8B are examples of the upper restrictor of FIG. 7.
Figure 8B:
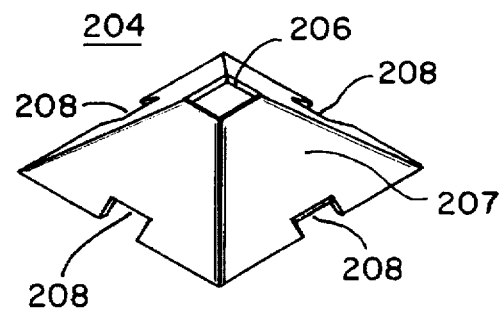

Examples of the upper restrictor 204 are shown in FIGS. 8A and 8B. In each case the restrictor 204 has a somewhat domed shaped portion 207 with a central aperture 206 to facilitate airflow upwardly. The dome portion 207 acts as an airflow restrictor. The restrictor also includes side apertures 208 which facilitate downward drainage of condensate while avoiding areas of accumulation which might encourage microbial growth. The restrictor 204 of FIG. 8A is circular as might be used in a circular chamber but could easily be modified to another shape, while the restrictor 204 of FIG. 8B is of a square shape but could easily be modified to another chamber's shape.

Figure 9A:
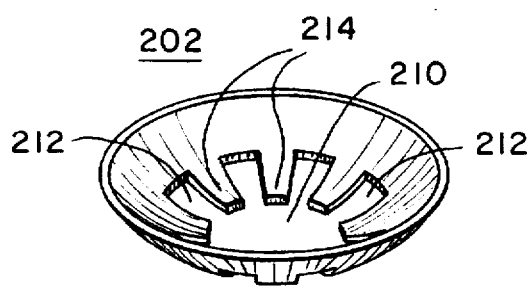
FIGS. 9A and 9B are examples of the lower restrictor of FIG. 7.
Figure 9B:
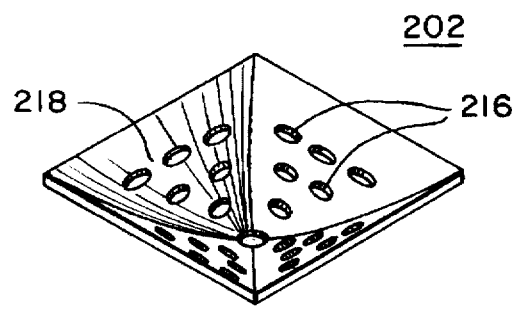

FIGS. 9A and 9B are examples of lower restrictors 202 having a bowl shape to facilitate drainage. In FIG. 9A the restrictor has a central drainage aperture 210 and side apertures 212 to help facilitate airflow. Arms 214 act as airflow restrictors. In the case of FIG. 9B the lower restrictor 202 includes a plurality of apertures 216 to facilitate drainage and airflow and a surface 218 which acts to restrict airflow to that passing through the apertures 216.

While the foregoing has described several embodiments of the condensate trap assembly, various modifications and alternatives are contemplated including the application of the condensate trap assembly to furnaces not described above.

What is desired to be secured as Letters Patent for the United States is set forth in the following claims.

What is claimed is:

1. A condensate trap assembly comprising:

a housing having first and second condensate inlets where the first condensate inlet is sized to pass more condensate than the second condensate inlet;

the housing having an ambient air inlet providing access to an ambient air chamber within the housing; and the housing having a first condensate chamber open to the first condensate inlet, and a second condensate chamber open to the second condensate inlet;

wherein the first condensate chamber, the second condensate chamber, and the ambient air chamber are open to each other and wherein the first condensate chamber includes airflow restrictors to retard the volume of airflow through the first chamber.

2. The trap assembly of claim 1 including a reservoir open to the first condensate chamber, second condensate chamber, and the ambient air chamber.

3. The trap assembly of claim 2 including a tuning fork shape partition separating the chambers from each other.

4. The trap assembly of claim 3 wherein the restrictors are staggered and have a downward slope.

5. The trap assembly of claim 4 wherein the restrictors form a gap sized to optimize the egress of ambient air and simultaneously to optimize the ingress of the first fluid.

6. The trap assembly of claim 5 wherein one of the restrictors includes a portion extending into the reservoir.

7. The trap assembly of claim 6 wherein the restrictors comprise first and second extensions respectively extending in a horizontal direction from the housing and the partition.

8. The trap assembly of claim 7 wherein a first pair of the restrictors is located at a lowermost portion of the partition and a second pair of restrictors is located at the first condensate inlet.

9. A condensate drain trap comprising:
a housing having first, second and third chambers;
the housing including a first aperture having a first size and providing ingress for a first fluid into the first chamber and providing egress for a second fluid from the first chamber;
the housing including a second aperture having a second size less than the first size and providing ingress for the first fluid into the second chamber and providing egress for the second fluid from the second chamber;
the housing including a third aperture providing ingress for the second fluid into the third chamber and providing egress for the first fluid from the third chamber; and
the first chamber including restrictors to retard passage of the second fluid without substantially retarding the passage of the first fluid.

10. The trap assembly of claim 9 including a reservoir open to the first, second and third chambers.

11. The trap assembly of claim 10 including a tuning fork shape partition separating the first, second and third chambers from each other.

12. The trap assembly of claim 11 wherein the restrictors are staggered and have a downward slope.

13. The trap assembly of claim 12 wherein the restrictors form a gap sufficiently small to retard the egress of ambient air yet large enough to allow ingress of the first fluid.

14. The trap assembly of claim 13 wherein one of the restrictors includes a portion extending into the reservoir.

15. The trap assembly of claim 14 wherein the restrictors comprise first and second extensions respectively extending in a horizontal direction from the housing and the partition.

16. The trap assembly of claim 15 wherein a first pair of the restrictors is located at a lowermost portion of the partition and a second pair of restrictors is located in the first aperture.

17. A condensate drain trap assembly comprising:
a housing having an interior divided into a first inlet chamber, a second inlet chamber, and an outlet chamber;
the housing including a first aperture forming a first inlet to the first inlet chamber;
the housing including a second aperture forming a second inlet to the second inlet chamber;
the housing including a third aperture forming an outlet from the outlet chamber;
the size of the first inlet being greater than the size of the second inlet; and
the first inlet chamber including a plurality of restrictors adapted to enhance liquid flow while restricting airflow.

18. The trap assembly of claim 17 including a reservoir open to the first, second and third chambers.

19. The trap assembly of claim 18 including a tuning fork shape partition separating the first, second and third chambers from each other.

20. The trap assembly of claim 19 wherein the restrictors are staggered and have a downward slope.

21. The trap assembly of claim 20 wherein the restrictors form a gap of approximately the same size as the narrowest portion of the second inlet chamber.

22. The trap assembly of claim 21 wherein one of the restrictors includes a portion extending into the reservoir.

23. The trap assembly of claim 22 wherein the restrictors comprise first and second extensions respectively extending in a horizontal direction from the housing and the partition.

24. The trap assembly of claim 23 wherein a first pair of the restrictors is located at a lowermost portion of the partition and a second pair of restrictors is located in the first aperture.

25. The trap assembly of claim 21 wherein the gap is not located at its same level as the bottom of the third aperture so as to minimize the effect of biological growth.

26. A method of controlling condensate and airflow in a furnace comprising the steps of:
allowing impeded airflow through a condensate trap to a cold header box and to an inducer fan at startup;
providing unrestricted condensate drainage to the condensate trap from the inducer fan;
providing restricted condensate drainage to the condensate trap from the cold header box;
accumulating condensate in the condensate trap; and
blocking the flow of air through the condensate trap when the accumulated condensate reaches a first predetermined height.

27. The method of claim 26, including the step of blocking the flow of ambient air through the condensate trap to the cold header box when the condensate reaches a second predetermined height, the second predetermined height being less than the first predetermined height.

28. A gas furnace comprising:
a condensate trap assembly having first, second and third apertures;
a cold header box having an aperture adapted to drain condensate;
an inducer fan having an aperture adapted to drain condensate;
a housing about the condensate trap assembly, the cold header box and the inducer fan, the housing including an outlet;
a first condensate and ambient air line operatively connected between the cold box aperture and the first trap assembly aperture;
a second condensate and ambient air line operatively connected between the inducer fan aperture and the second trap assembly aperture; and
a third condensate and ambient air line between the housing outlet and the third aperture;
the condensate trap assembly including air pressure enhancement devices between the first aperture and the third aperture.

29. The furnace of claim 28 wherein the condensate trap assembly includes a first chamber between the first aperture and the third aperture, and the air pressure enhancement devices are within the first chamber.

30. The furnace of claim 29 wherein the air pressure enhancement devices are vanes extending from opposing walls of the first chamber.

31. The furnace of claim 30 wherein the vanes slope in a downward direction from the first chamber walls.

32. The furnace of claim 31 wherein the trap assembly includes a second chamber between the second aperture and the third aperture, a third chamber between the third aperture and the first and second chambers, and a condensate reservoir at a bottom of the trap assembly.

33. The furnace of claim 32 wherein the reservoir is arranged to block airflow to and from the third chamber whenever condensate reaches a first predetermined level.

34. The furnace of claim 33 further including a restrictor in the first chamber extending toward the reservoir and adapted to block airflow from the third chamber to the first chamber whenever the condensate reaches a second predetermined level in the reservoir, the second level being lower than the first level.

35. The furnace of claim 34 wherein the third aperture is located above the first level.

36. The furnace of claim 35 wherein there are no restrictors in the first chamber at the same height as the third aperture.

* * * * *